(12) United States Patent
Frenkiel et al.

(10) Patent No.: US 9,940,216 B2
(45) Date of Patent: Apr. 10, 2018

(54) SYSTEM AND METHOD FOR USING DEVELOPMENT OBJECTIVES TO GUIDE IMPLEMENTATION OF SOURCE CODE

(71) Applicant: International Business Machines Corporation, Armonk, NY (US)

(72) Inventors: Andrew Lawrence Frenkiel, Carlton (AU); Martin J. Hirzel, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/158,996

(22) Filed: May 19, 2016

(65) Prior Publication Data

US 2016/0266994 A1     Sep. 15, 2016

Related U.S. Application Data

(63) Continuation of application No. 14/283,511, filed on May 21, 2014, now Pat. No. 9,361,068.

(51) Int. Cl.
*G06F 9/44*     (2006.01)
*G06F 9/45*     (2006.01)
(Continued)

(52) U.S. Cl.
CPC ............ *G06F 11/3604* (2013.01); *G06F 8/20* (2013.01); *G06F 8/30* (2013.01); *G06F 8/33* (2013.01);
(Continued)

(58) Field of Classification Search
CPC ..... G06F 8/41; G06F 8/20; G06F 8/34; G06F 8/30; G06F 11/3664; G06F 17/5045;
(Continued)

(56) References Cited

U.S. PATENT DOCUMENTS 7,844,957 B2    11/2010  Doucette ................... G06F 8/30
                                                                717/105
8,397,172 B2 *   3/2013  Kodosky ............ G05B 19/0426
                                                                715/762
(Continued)

FOREIGN PATENT DOCUMENTS

WO         2011031328         3/2011

OTHER PUBLICATIONS

Piccioni et al., An IDE-based, Integrated Solution to Schema Evolution of Object-Oriented Software, Nov. 2009, 5 pages.*
(Continued)

*Primary Examiner* — Thuy Dao
(74) *Attorney, Agent, or Firm* — Fleit Gibbons Gutman Bongini Bianco PL; Jose Gutman

(57) ABSTRACT

An information processing system, computer readable storage medium, and method with an integrated development environment to guide development of applications to implement a programming design objective. A method includes analyzing a selected portion of source code according to meeting each programming design objective from a set of programming design objectives; selecting, based on the analyzing, at least one programming design objective from the programming design objectives, the selected at least one programming design objective being determined suitable for the selected portion of source code based on one of conforming with constraints of the objective, or failing to conform and determining a quick fix can be applied by update to the source code to make it conform. The method outputs a message corresponding to the selected portion of source code and indicative of the selected programming design objective suitable for the portion of source code.

18 Claims, 25 Drawing Sheets

(51) Int. Cl.
  *G06F 11/36* (2006.01)
  *G06F 3/048* (2013.01)
(52) U.S. Cl.
  CPC .................. *G06F 8/34* (2013.01); *G06F 9/44* (2013.01); *G06F 11/3664* (2013.01)
(58) Field of Classification Search
  CPC ...... G06F 11/323; G06F 11/3604; G06F 8/33; G06F 9/44
  See application file for complete search history.

(56) References Cited

U.S. PATENT DOCUMENTS

| | | | | |
|---|---|---|---|---|
| 8,418,071 | B2* | 4/2013 | Kodosky | G05B 19/0426 715/734 |
| 8,429,617 | B2* | 4/2013 | Demetriou | G06F 11/3664 714/35 |
| 8,612,926 | B2 | 12/2013 | Hughes | G06F 8/20 705/26.1 |
| 8,863,082 | B2 | 10/2014 | Tsao | G06F 9/44 717/120 |
| 9,058,177 | B2* | 6/2015 | Chiluvuri | G06F 8/36 |
| 9,170,782 | B2* | 10/2015 | Carter | G06F 8/33 |
| 9,213,541 | B2 | 12/2015 | Araya | G06F 8/71 |
| 9,218,166 | B2 | 12/2015 | Ramanathan | G06F 8/36 |
| 9,733,903 | B2* | 8/2017 | Bates | G06F 8/34 |
| 2006/0101435 | A1 | 5/2006 | Akilov et al. | |
| 2006/0123279 | A1* | 6/2006 | Cardinell | G06F 8/54 714/718 |
| 2006/0236310 | A1* | 10/2006 | Domeika | G06F 8/443 717/140 |
| 2009/0119549 | A1* | 5/2009 | Vertes | G06F 11/3414 714/47.1 |
| 2011/0022551 | A1 | 1/2011 | Dixon | |
| 2011/0283270 | A1 | 11/2011 | Gass et al. | |
| 2013/0007717 | A1 | 1/2013 | Bates | 717/125 |
| 2014/0040858 | A1 | 2/2014 | Ivan | G06F 8/443 717/109 |
| 2016/0026439 | A1* | 1/2016 | Zaydman | G06F 8/33 717/113 |

OTHER PUBLICATIONS

Naudziuniene et al., jStar-eclipse: an IDE for automated verification of Java programs, Sep. 2011, 4 pages.*
List of IBM Patents or Applications Treated as Related.
St-Amour, V. et al., "Optimization Coaching: Optimizers Learn to Communicate with Programmers." OOPSLA'12. Oct. 19-26, 2012. pp. 1-16. Tuscon, Arizona.
Treude et al., The implications of how we tag software artifacts: exploring different schemata and metadata for tags, May 2010, 2 pages.
Wang et al., Tagging in assisted tracing, May 2015, 7 pages.

* cited by examiner

FIG. 3

1. User creates composite operator, adds "@parallel" tag.

302 — @Parallel
composite Vwap {
}

2. User gets completion proposals for graph clause

@Parallel
composite Vwap {
param
expression<set<rstring>>
graph
}

FIG. 4

402
- Operator invocation
- Aggregate – Basic Aggregate template — 404
- Aggregate with groupby – Aggregate Template with groupby — 408
- Aggregate – Template using partitioned windows — 408
- Barrier – Basic Barrier template — 406
- Beacon – Basic Beacon template
- ...
- FileSink – File sink template
- FileSource – File source template — 404
- Functor – Basic Functor template — 408
- Join – Basic join template
- Join with Equality Expression – Equi-join template — 406

*Lexiographic order shown. May be Ordered by "parallelizability".*

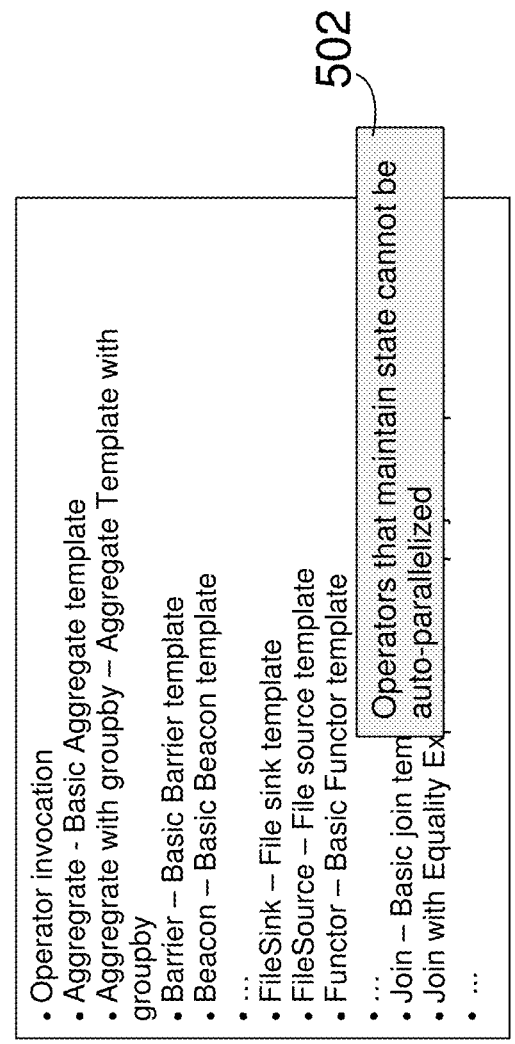

FIG. 6

3. User adds code for three operators. A warning marker and quick fix icon for the FileSource are displayed by IDE.

```
@Parallel
composite Vwap {
  param
    expression<set<rstring>> $monitoredTickers : { "IBM", "GOOG", "MSFT" };
  graph
    stream<TQRecT> TradeQuote = FileSource() {
      // code not shown
    } stream<TradeFilterT> TradeFilter = Functor(TradeQuote) {
      // code not shown
    } stream<QuoteFilterT> QuoteFilter = Functor(TradeQuote) {
      // code not shown
    }
}
```

4. Flyover on warning marker explains that FileSource can't be auto parallelized.

```
@Parallel
composite Vwap {
  param
    expression<set<rstring>> $monitoredTickers : { "IBM", "GOOG", "MSFT" };
  graph
    stream<TQRecT> TradeQuote = FileSource() {
                                ┌─────────────────────────────────────┐
    602 ─┐                      │ FileSource operator cannot be auto-parallelized   │ ─── 702
         ·                      │ (@Parallel)                         │
                                └─────────────────────────────────────┘ stream<TradeFilterT> TradeFilter = Functor(TradeQuote) {
      // code not shown
    } stream<QuoteFilterT> QuoteFilter = Functor(TradeQuote) {
      // code not shown
    }
}
```

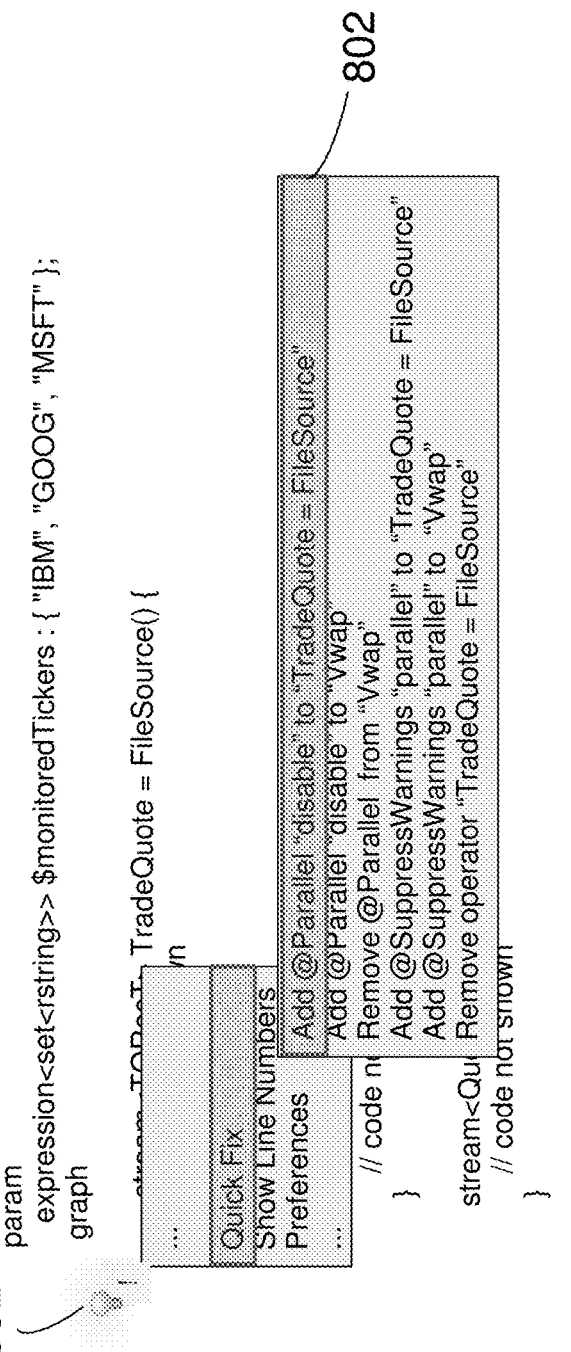

FIG. 9

6. *Quick fix to disable auto parallization applied to FileSource, warning marker disappears.*

```
@Parallel
composite Vwap {
param
  expression<set<rstring>> $monitoredTickers : { "IBM", "GOOG", "MSFT" };
graph @Parallel("disable")
  stream<TQRecT> TradeQuote = FileSource() {
    // code not shown
  } stream<TradeFilterT> TradeFilter = Functor(TradeQuote) {
    // code not shown
  } stream<QuoteFilterT> QuoteFilter = Functor(TradeQuote) {
    // code not shown
  }
}
```

FIG. 10

7. User gets completion proposals for Functor clauses

```
@Parallel
composite Vwap {
param
  expression<set<rstring>> $monitoredTickers : { "IBM", "GOOG", "MSFT" };

graph stream<TQRecT> TradeQuote = FileSource() {
  // code not shown
} stream<TradeFilterT> TradeFilter = Functor(TradeQuote) {
  // code not shown
} stream<QuoteFilterT> QuoteFilter = Functor(TradeQuote) {
    {...} logic
    {...} output         1002
    {...} config
}

8. User selects logic clause, and gets completion proposals logic labels

```
@Parallel
composite Vwap {
  param
    expression<set<rstring>> $monitoredTickers : { "IBM", "GOOG", "MSFT" };
  graph
    @Parallel("disable")
    stream<TQRecT> TradeQuote = FileSource() {
      // code not shown
    }
    stream<TradeFilterT> TradeFilter = Functor(TradeQuote) {
      // code not shown
    }
    stream<QuoteFilterT> QuoteFilter = Functor(TradeQuote) {
      logic
        state
        onTuple                    ⎫ 1102
        onPunct
    }
}
```

FIG. 12

9. User defines stateful variable in Functor's logic clause. A warning marker and quick fix icon indicate that the stateful variable preclude Functor from being auto parallized.

```
@Parallel
composite Vwap {
  param
    expression<set<rstring>> $monitoredTickers : { "IBM", "GOOG", "MSFT" };

graph
    @Parallel("disable")
    stream<TQRecT> TradeQuote = FileSource() {
      // code not shown
    } stream<TradeFilterT> TradeFilter = Functor(TradeQuote) {
      // code not shown
    } stream<QuoteFilterT> QuoteFilter = Functor(TradeQuote) {
      logic state : mutable in64 num_filtered = 0;
      // code not shown.
    }
}
```

10. User hovers over warning marker and reveals flyover.

```
@Parallel
composite Vwap {
param
  expression<set<rstring>> $monitoredTickers : { "IBM", "GOOG", "MSFT" };
graph
  @Parallel("disable")
  stream<TQRecT> TradeQuote = FileSource() {
    // code not shown
  } stream<TradeFilterT> TradeFilter = Functor(TradeQuote) {
    // code not shown
  } stream<QuoteFilterT> QuoteFilter = Functor(TradeQuote) {
    logic state : mutable in64 num_filtered = 0;
```

1202

1302 — num_filtered non-partitioned stateful variable cannot be auto-parallelized (@Parallel)

FIG. 14

11. User gets list of quick fixes, and selects action to ignore warning.

```
@Parallel
composite Vwap {
param
  expression<set<rstring>> $monitoredTickers : { "IBM", "GOOG", "MSFT" };

graph

@Parallel("disable")
  stream<TQRecT> TradeQuote = FileSource() {
    // code not shown
  } stream<TradeFilterT> TradeFilter = Functor(TradeQuote) {
    // code not shown
  } stream<QuoteFilterT> QuoteFilter = Functor(TradeQuote) {
    mutable in64 num_filtered = 0;
```

1202

| Quick Fix | Add @Parallel "disable" to "QuoteFilter = Functor" |
| Show Line | Add @Parallel "disable" to "Vwap" |
| Numbers | Remove @Parallel from "Vwap" |
| Preferences | Remove "num_filtered" |
| | Add @SuppressWarnings "parallel" to "num_filtered" |
| | Add @SuppressWarnings "parallel" to "QuoteFilter = Functor" |
| | Add @SuppressWarnings "parallel" to "Vwap" |

12. User applies fix to suppress warnings for stateful num_filtered, warning marker disappears.

```
@Parallel
composite Vwap {
  param
    expression<set<rstring>> $monitoredTickers : {"IBM", "GOOG", "MSFT"};
  graph
    @Parallel("disable")
    stream<TQRecT> TradeQuote = FileSource() {
      // code not shown
    }
    stream<TradeFilterT> TradeFilter = Functor(TradeQuote) {
      // code not shown
    }
    stream<QuoteFilterT> QuoteFilter = Functor(TradeQuote) {
      @SuppressWarnings("parallel")
      logic state : mutable in64 num_filtered = 0;
      // code not shown.
    }
}
```

13. *User adds additional operators and completes applications. Warning markers generated for Join and FileSink operators that cannot be auto-parallelized.*

```
@Parallel
composite Vwap {
  param
    expression<set<rstring>> $monitoredTickers : { "IBM", "GOOG", "MSFT" };
  graph
    @Parallel("disable")
    stream<TQRecT> TradeQuote = FileSource() {
      // code not shown
    } stream<TradeFilterT> TradeFilter = Functor(TradeQuote) {
      // code not shown
    } stream<QuoteFilterT> QuoteFilter = Functor(TradeQuote) {
      @SuppressWarnings("parallel")
      logic state : mutable in64 num_filtered = 0;
      // code not shown
    } stream<VwapT, tuple<decimal64 sumvolume>> PreVwap = Aggregate(TradeFilter) {
      // uses partitioned windows, so can be parallelized.  Code not shown.
    } stream<VwapT> Vwap = Functor(PreVwap)
      // code not shown stream<BargainIndexT> BargainIndex = Join(Vwap as V; QuoteFilter as Q) {
      // code not shown
      Join operator not consistent with @Parallel
    }

// code not shown
}
```

14. *User fixes code by adding @Parallel("disable") annotation to disable auto-parallelization for Join and FileSink operators.*

```
@Parallel
composite Vwap {
param
  expression<set<rstring>> $monitoredTickers : { "IBM", "GOOG", "MSFT" };

graph
  @Parallel("disable")
  stream<TQRecT> TradeQuote = FileSource() {
    // code not shown
  } stream<TradeFilterT> TradeFilter = Functor(TradeQuote) {
    // code not shown
  } stream<QuoteFilterT> QuoteFilter = Functor(TradeQuote) {
    @SuppressWarnings("parallel")
    logic state : mutable int64 num_filtered = 0;
    // code not shown.
  } stream<VwapT, tuple<decimal64 sumvolume>> PreVwap = Aggregate(TradeFilter) {
    // uses partitioned windows, so can be parallelized. Code not shown.
  } stream<VwapT> Vwap = Functor(PreVwap)
    // code not shown

@Parallel("disable")
  stream<BargainIndexT> BargainIndex = Join(Vwap as V; QuoteFilter as Q) {
    // code not shown
  }

@Parallel("disable")
  () as SinkOp = FileSink(BargainIndex) {
    // code not shown
  }
}
```

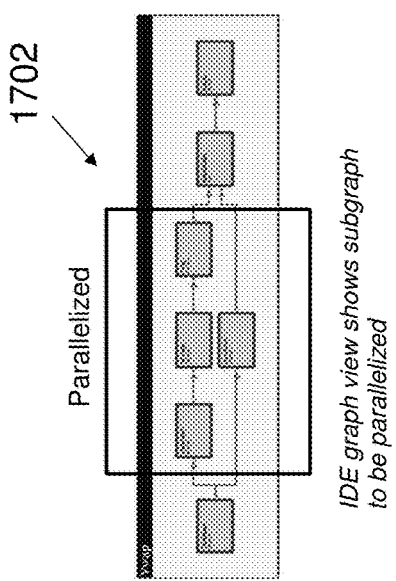

1702

Parallelized

IDE graph view shows subgraph to be parallelized

FIG. 18

An equivalent and alternative tagging -- tag individual operators rather than composite

```
composite Vwap {
param
  expression<set<rstring>> $monitoredTickers : { "IBM", "GOOG", "MSFT" };
graph
  @Parallel("disable")
  stream<TQRecT> TradeQuote = FileSource() {
    // code not shown
  }
  @Parallel
  stream<TradeFilterT> TradeFilter = Functor(TradeQuote) {
    // code not shown
  }
  @Parallel
  stream<QuoteFilterT> QuoteFilter = Functor(TradeQuote) {
    @SuppressWarnings("parallel")
    logic state : mutable in64 num_filtered = 0;
    // code not shown.
  }
  @Parallel
  stream<VwapT, tuple<decimal64 sumvolume>> PreVwap = Aggregate(TradeFilter) {
    // uses partitioned windows, so can be parallelized. Code not shown.
  }
  @Parallel
  stream<VwapT> Vwap = Functor(PreVwap)
    // code not shown
  }
  @Parallel("disable")
  stream<BargainIndexT> BargainIndex = Join(Vwap as V; QuoteFilter as Q) {
    // code not shown
  }
  @Parallel("disable")
  () as SinkOp = FileSink(BargainIndex) {
    // code not shown
  }
}
```

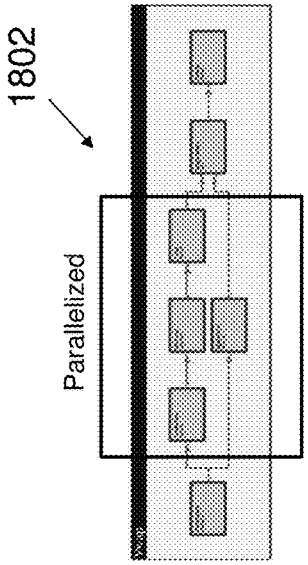

1802

Parallelized

IDE graph view shows subgraph to be parallelized

FIG. 19

1. Developer starts with VWAP application that has no annotations (e.g. @Parallel)

```
composite Vwap {
param
  expression<set<rstring>> $monitoredTickers : {"IBM", "GOOG", "MSFT"};
graph
  stream<TQRecT> TradeQuote = FileSource() {
    // code not shown
  }
  stream<TradeFilterT> TradeFilter = Functor(TradeQuote) {
    // code not shown
  }
  stream<QuoteFilterT> QuoteFilter = Functor(TradeQuote) {
    // code not shown.
  }
  stream<VwapT, tuple<decimal64 sumvolume>> PreVwap = Aggregate(TradeFilter) {
    // uses partitioned windows, so can be parallelized. Code not shown.
  }
  stream<VwapT> Vwap = Functor(PreVwap)
    // code not shown
  }
  stream<BargainIndexT> BargainIndex = Join(Vwap as V; QuoteFilter as Q) {
    // code not shown
  }
  () as SinkOp = FileSink(BargainIndex) {
    // code not shown
  }
}
```

FIG. 21

3. Developer accepts suggestion to add @Parallel to operators that support auto-parallelization

```
composite Vwap {
  param
    expression<set<rstring>> $monitoredTickers : { "IBM", "GOOG", "MSFT" };
  graph
    stream<TQRecT> TradeQuote = FileSource() {
      // code not shown
    }
    @Parallel
    stream<TradeFilterT> TradeFilter = Functor(TradeQuote) {
      // code not shown
    }
    @Parallel
    stream<QuoteFilterT> QuoteFilter = Functor(TradeQuote) {
      // code not shown
    }
    @Parallel
    stream<VwapT, tuple<decimal64 sumvolume>> PreVwap = Aggregate(TradeFilter) {
      // uses partitioned windows, so can be parallelized. Code not shown.
    }
    @Parallel
    stream<VwapT> Vwap = Functor(PreVwap) {
      // code not shown
    }
    stream<BargainIndexT> BargainIndex = Join(Vwap as V; QuoteFilter as Q) {
      // code not shown
    }
    () as SinkOp = FileSink(BargainIndex) {
      // code not shown
    }
}
```

FIG. 22

4. Developer adds stateful variable to Functor annotated with @Parallel. IDE SC Analyzer displays warning and fix markers since the stateful variable can't be parallelized.

```
composite Vwap {
  param
    expression<set<rstring>> $monitoredTickers : { "IBM", "GOOG", "MSFT" };
  graph
    stream<TQRecT> TradeQuote = FileSource() {
      // code not shown
    }
    @Parallel
    stream<TradeFilterT> TradeFilter = Functor(TradeQuote) {
      // code not shown
    }
    @Parallel
    stream<QuoteFilterT> QuoteFilter = Functor(TradeQuote) {
      logic state :  mutable in64 num_filtered = 0;
      // code not shown.
    }
                                    num_filtered non-partitioned stateful variable
                                    cannot be auto-parallelized (@Parallel)
                              ─────gregate(TradeFilter) {
      // uses partitioned windows, so can be parallelized. Code not shown.
    }
    @Parallel
    stream<VwapT> Vwap = Functor(PreVwap)
      // code not shown
    }
    stream<BargainIndexT> BargainIndex = Join(Vwap as V; QuoteFilter as Q) {
      // code not shown
    }
    () as SinkOp = FileSink(BargainIndex) {
      // code not shown
    }
}
```

5. Developer selects quick fix for warning about num_filtered variable.

```
composite Vwap {
  param
    expression<set<rstring>> $monitoredTickers : {"IBM", "GOOG", "MSFT"};
  graph
    stream<TQRecT> TradeQuote = FileSource() {
      // code not shown
    }
    @Parallel
    stream<TradeFilterT> TradeFilter = Functor(TradeQuote) {
      // code not shown
    }
    @Parallel
    stream<QuoteFilterT> QuoteFilter = Functor(TradeQuote) {
      logic state : mutable in64 num_filtered = 0;
      // code not shown
    }
    stream<decimal64 sumvolume>> PreVwap = Aggregate(TradeFilter) {
      // code not shown
    }
    stream<Ba...
      // code no
    }
    () as SinkOp = FileSink(BargainIndex) {
      // code not shown
    }
}
```

Quick Fix menu (2302):
- Add @Parallel "disable" to "QuoteFilter = Functor"
- Add @Parallel "disable" to "Vwap"
- Remove @Parallel from "Vwap"
- Remove "num_filtered"
- Add @SuppressWarnings "parallel" to "num_filtered"
- Add @SuppressWarnings "parallel" to "QuoteFilter = Functor"
- Add @SuppressWarnings "parallel" to "Vwap"
- Show Line Numbers
- Preferences

FIG. 24

6. IDE SC Analyzer effects quick fix, and adds a @SuppressWarnings annotation to Functor. Associated markers are removed.

```
composite Vwap {
  param
    expression<set<rstring>> $monitoredTickers : { "IBM", "GOOG", "MSFT" };
  graph
    stream<TQRecT> TradeQuote = FileSource() {
      // code not shown
    }
    @Parallel
    stream<TradeFilterT> TradeFilter = Functor(TradeQuote) {
      // code not shown
    }
    @Parallel
    stream<QuoteFilterT> QuoteFilter = Functor(TradeQuote) {
      @SuppressWarning
      logic state : mutable int64 num_filtered = 0;
      // code not shown.
    }
    @Parallel
    stream<VwapT, tuple<decimal64 sumvolume>> PreVwap = Aggregate(TradeFilter) {
      // uses partitioned windows, so can be parallelized. Code not shown.
    }
    @Parallel
    stream<VwapT> Vwap = Functor(PreVwap)
      // code not shown
    }
    stream<BargainIndexT> BargainIndex = Join(Vwap as V; QuoteFilter as Q) {
      // code not shown
    }
    () as SinkOp = FileSink(BargainIndex) {
      // code not shown
    }
}
```

SYSTEM AND METHOD FOR USING DEVELOPMENT OBJECTIVES TO GUIDE IMPLEMENTATION OF SOURCE CODE

BACKGROUND

The present disclosure generally relates to integrated development environments for development of software source code, and more particularly relates to an information processing system that interactively guides implementation of source code based on programming design objectives.

In the domain of high performance and big data applications, developers want to write code that can exploit the advanced optimization and safety features provided by these types of compilers and runtime environments. For example, for distributed runtime systems used to process "Big Data", it's often advantageous for developers to exploit optimizations such as parallelizing the execution of code and relocating executing code between hosts at runtime. Similarly, some languages and specialized runtime environments (such as IBM InfoSphere Streams™) supports safety features such as saving and restoring program state. Writing software that can exploit these features is often critical in realizing cost, performance and stability objectives that are typical of applications that perform securities trading, industrial control systems (SCADA), real-time sentiment analysis, order fulfillment, and so on. However, writing source code that can exploit these features typically requires the developer to adhere to a set of subtle, non-obvious and intricate constraints. For example, to implement software that can be automatically parallelized by the application runtime, the developer needs to ensure that the code is not dependent on preserved state across program executions, or that the preserved state is defined in such a way that the runtime can automatically partition the state between the parallel instances of the executing code. In practice, many developers are not expert at the art of implementing such code, and popular programming languages (e.g. Java, C++) do not provide explicit support for enabling auto parallelization, for example. Enabling these capabilities may require the user to adhere to subtle, non-obvious, and intricate constraints on how they implement their code.

For example, consider a scenario where a software developer wants to write code that can be parallelized (by the compiler and runtime environment). An architecture design choice for that software (or a code segment thereof) that maintains a persistent state may make the code non-parallelizable. As another example, consider a scenario where a software developer wants to write code that is deterministic and will always generate the same results given the same input. A software design choice that always uses absolute time values may make the code non-deterministic.

Understanding implications of code design structure, features, and functions, and the associated run time behavior, in meeting design objectives (e.g., runtime parallelism or deterministic results) can be very challenging. Knowing how to achieve optimization and safety objectives may require deep expertise.

Using currently available methods and tools, developers often resort to a prolonged trial and error process to implement software that exploits the optimization and safety capabilities referenced in the above examples. That is, developers write code that seems to implement the design objectives, submit the application to the runtime environment, and observe any undesirable behavior and/or errors that result. The developer will then attempt to infer required changes to the source code, and re-test the application. While this iterative process is similar to a code-debug cycle, it is typically much less effective: it's challenging for the developer to infer the required code changes, and to ensure that their code is fully exploiting the capabilities provided by the compiler and runtime.

Current code development requires iterative trial and error to try to solve these types of problems with code design structure, features, and functions, and the associated run time behavior, failing to meet design objectives. Typically, a developer implements code with some design objective in mind (e.g., runtime parallelization). The developer then receives warning and error messages from a compiler and/or a runtime environment, e.g., if the code can't be parallelized. The developer then fixes the code to correct according to the error messages. The developer then re-tests. During the iterative development process, unfortunately, the warning and error messages to the developer may not clearly describe the design objectives that the developer's code failed to meet. There is little guidance to the developer for writing code that conforms to the design objectives. Knowing how to achieve optimization and safety objectives could require deep expertise in software architecture design choices implemented in the code.

BRIEF SUMMARY

According to one embodiment of the present disclosure, a method with an integrated development environment guides development of applications to implement a programming design objective, comprising: analyzing, with a source code analyzer of an integrated development environment, a selected at least a portion of source code stored in memory according to meeting each programming design objective from a set of programming design objectives stored in memory; selecting, based on the analyzing, at least one programming design objective from a set of programming design objectives stored in memory, the selected at least one programming design objective being determined suitable for the selected at least a portion of source code, wherein the determination that the selected at least one programming design objective is suitable for the selected at least a portion of source code is based on one of: a determination that the selected at least a portion of source code conforms with the constraints of the selected programming design objective; or a determination that the selected at least a portion of source code fails to conform to one or more constraints of the selected programming design objective, and a further determination that a quick fix may be applied by an update to the at least a portion of source code so that it conforms with the constraints of the selected programming design objective; and outputting, in response to the analyzing with the source code analyzer, a message corresponding to the selected at least a portion of source code, wherein the message is based on, and indicative of, the selected programming design objective suitable for the selected at least a portion of source code.

According to another embodiment of the present disclosure, an information processing system comprises: a user output interface; memory for storing source code; a source code configuration rules repository for storing source code configuration rules and programming design objectives for development of applications; an integrated development environment (IDE) comprising a source code editor and at least one of a programming language compiler and a runtime; a source code analyzer for analyzing selected source code stored in the memory, and in response to the analyzing outputting a message; and a processor communicatively coupled to the memory, the source code configuration rules repository, the IDE, and the source code analyzer, and wherein the processor, responsive to executing computer instructions, performs operations comprising: analyzing, with a source code analyzer of an integrated development environment, a selected at least a portion of source code stored in memory according to meeting each programming design objective from a set of programming design objectives stored in memory; selecting, based on the analyzing, at least one programming design objective from a set of programming design objectives stored in memory, the selected at least one programming design objective being determined suitable for the selected at least a portion of source code, wherein the determination that the selected at least one programming design objective is suitable for the selected at least a portion of source code is based on one of: a determination that the selected at least a portion of source code conforms with the constraints of the selected programming design objective; or a determination that the selected at least a portion of source code fails to conform to one or more constraints of the selected programming design objective, and a further determination that a quick fix may be applied by an update to the at least a portion of source code so that it conforms with the constraints of the selected programming design objective; and outputting, in response to the analyzing with the source code analyzer, a message corresponding to the selected at least a portion of source code, wherein the message is based on, and indicative of, the selected programming design objective suitable for the selected at least a portion of source code.

According yet to another embodiment of the present disclosure, a computer readable storage medium comprises computer instructions which, responsive to being executed by a processor, cause the processor to perform operations comprising: analyzing, with a source code analyzer of an integrated development environment, a selected at least a portion of source code stored in memory; selecting, based on the analyzing, a programming design objective from a set of programming design objectives stored in memory, the selected programming design objective being determined suitable for the selected at least a portion of source code; and outputting, in response to the analyzing with the source code analyzer, a message corresponding to the selected at least a portion of source code, wherein the message is based on the selected programming design objective.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 3 to 18 are a set of program listings on a display showing a first continuing example of development of program source code, according to various examples of the present disclosure;

FIGS. 19-24 are a set of program listings on a display showing a second continuing example of development of program source code, according to various examples of the present disclosure.

DETAILED DESCRIPTION

Figure 1:
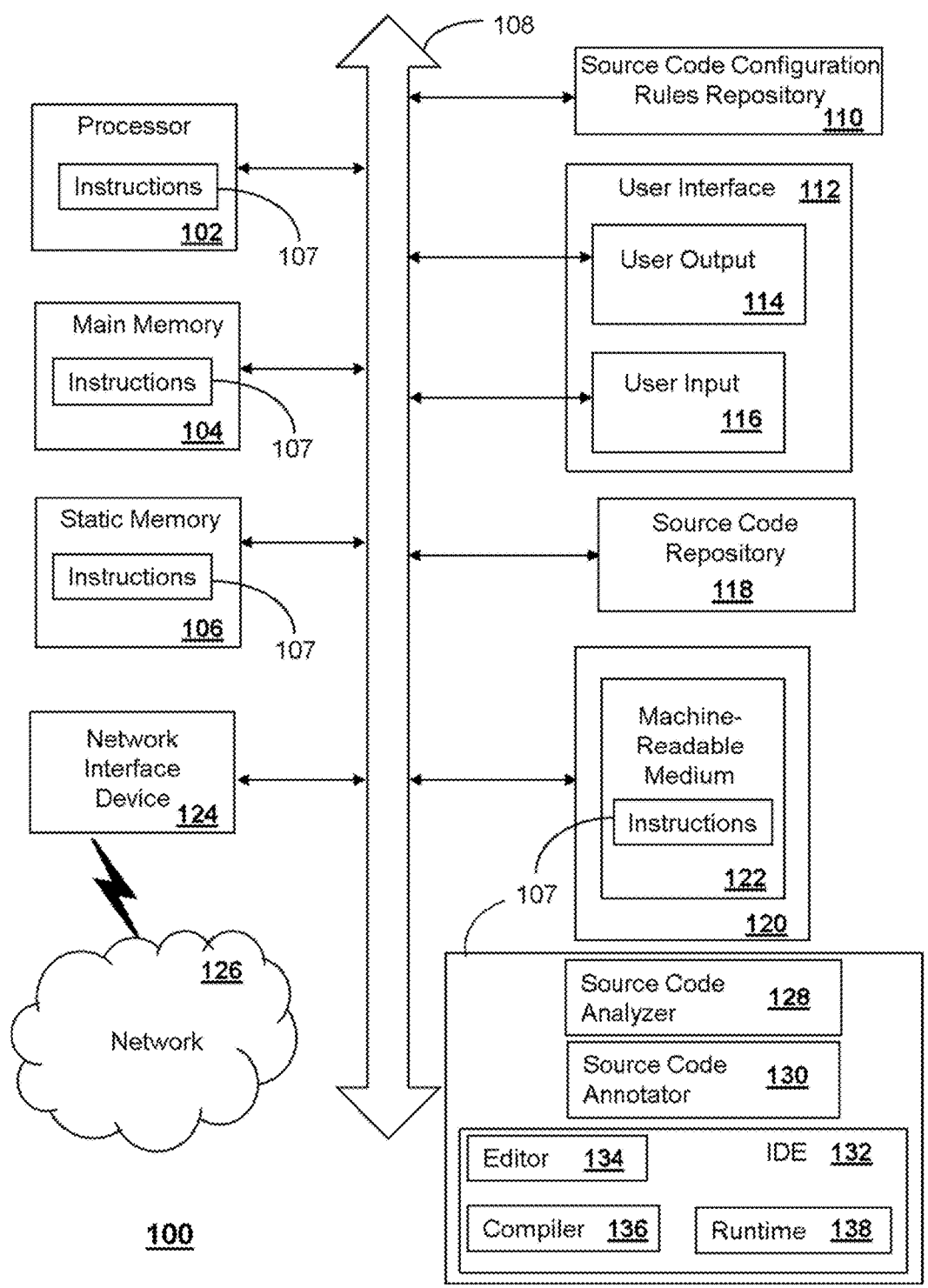
FIG. 1 is a block diagram illustrating an example of an information processing system, according to one embodiment of the present disclosure.

According to the example shown in FIG. 1, at least one processor 102 is communicatively coupled with main memory 104 and with static (non-volatile) memory 106. Computer program instructions and data 107 may be stored in the main memory, the static memory and in the processor 102. The processor 102 operates according to the instruction 107 to provide the features and functions of the information processing system 100. According to the present example, a bus architecture 108 links various components of the information processing system 100 as shown. The processor 102 is communicatively coupled with a source code configuration rules repository 110. The rules and associated information stored in the source code configuration rules repository 110 can be used by the processor 102 in accordance with the instructions 107 as will be discussed in more detail below.

The user interface 112 includes user output interface 114 and user input interface 116. The user output interface 114 includes, according to the present example, a display, and audio output interface such as one or more speakers, and various indicators such as visual indicators, audible indicators, and haptic indicators. A user input interface 116 includes, according to the present example, a keyboard, a mouse or other cursor navigation module such as a touch screen, touch pad, a pen input interface, and a microphone for input of audible signals such as user speech, data and commands that can be recognized by the processor 102.

A source code repository 118 is communicatively coupled with the processor 102. The source code repository 118 stores one or more source code modules that can be processed by the processor 102 to provide the inventive features and functions of the present disclosure as will be discussed below. A machine readable medium reader and/or writer interface 120 is communicatively coupled with the processor 102 and facilitates reading from and writing to the machine readable medium 122 which may include instructions 107 and data.

A network interface device 124 is communicatively coupled with the processor 102 and allows the information processing system 100 to be communicatively coupled with one or more networks 126. In this way, the information processing system 100 can communicate with other systems and devices that are communicatively coupled via the one or more networks 126. It should be noted that in certain embodiments the information processing system 100 may include a distributed architecture comprising a plurality of processors communicatively coupled via the one or more networks 126.

According to the present example, the instructions include a source code analyzer 128 that can be invoked and interoperate with the processor 102. The source code analyzer 128 can analyze at least a portion of source code modules stored in the source code repository 118 and communicate information with a user via the user interface 112 (such as by presenting, e.g., displaying, a message via the user output interface 114), as will be discussed in more detail below. A source code annotator 130 can inter-operate with the processor 102 to provide tags and annotations to source code stored in the source code repository 118, as will be further discussed below.

Instructions 107 comprise instructions for an integrated development environment 132 that includes an editor 134 for editing documents such as source code files stored in the source code repository 118, and at least one of a compiler 136 to compile source code such as from a source code file stored in the source code repository 118, and a run time environment (runtime) 138 that can be used by the integrated development environment 132 to run and execute programs according to the source code files stored in the source code repository 118. The compiler 136 typically compiles the source code from the source code files to create one or more executable programs that then are submitted to the run time environment (runtime) 138 that then can execute the program instructions according to the source code. According to the present example, the integrated development environment 132 can invoke and inter-operate with the source code analyzer 128 and the source code annotator 130 to provide the new and novel features and functions according to the present disclosure, as will be discussed in more detail below.

Figure 2:
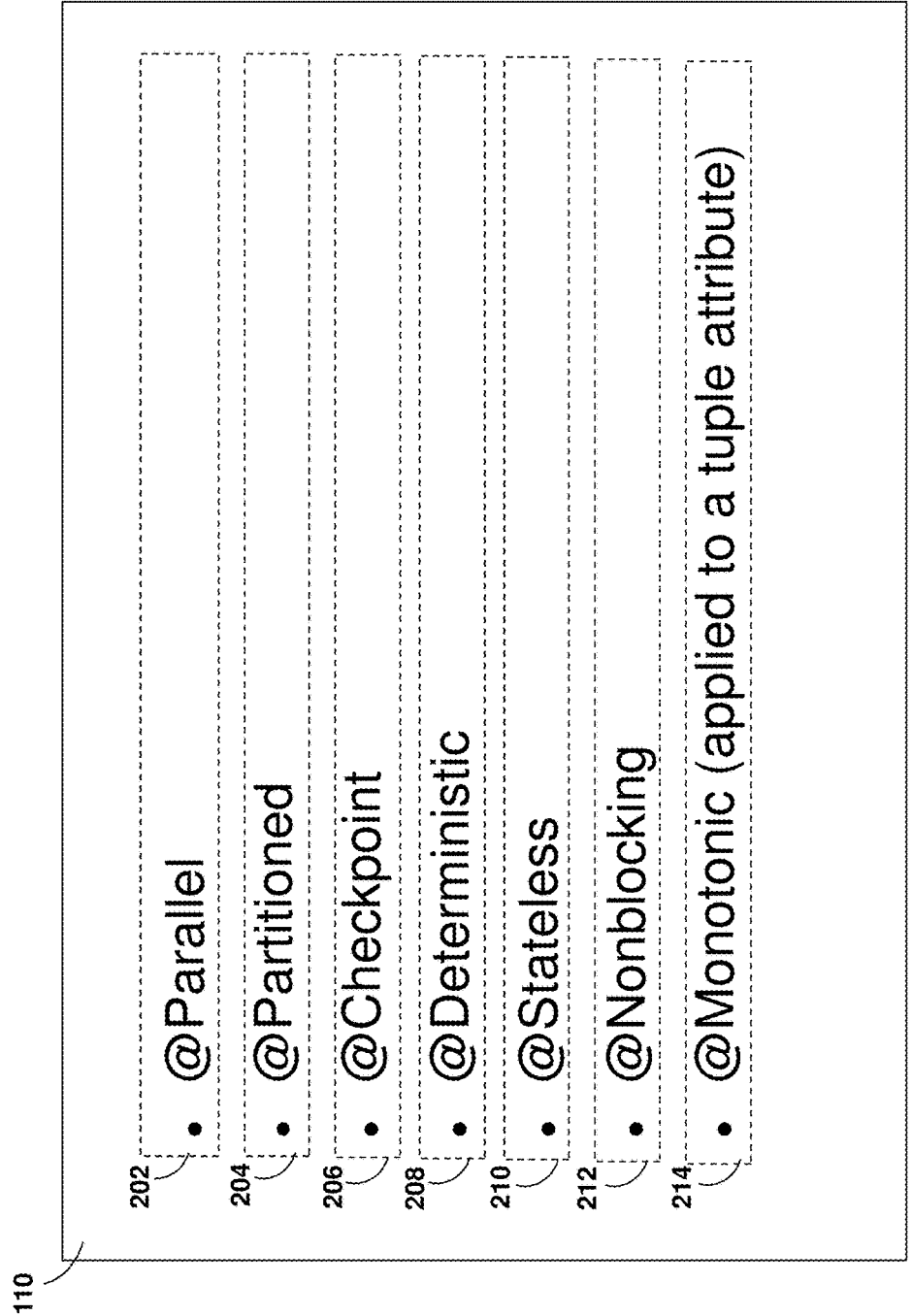
FIG. 2 is a block diagram illustrating an example of a source code configuration rules repository used by the information processing system of FIG. 1.

FIG. 2 illustrates an example of a source code configuration rules repository 110. One or more rules (and related programming design objectives) 202, 204, 206, 208, 210, 212, 214, can be stored in the source code configuration rules repository 110. Each rule identifies a particular source code programming architecture objective (or also referred to as a programming design objective), for a design of program source code as may be stored in one or more files in the source code repository 118. Each rule, according to the present example, is associated with a particular tag or annotation for source code that can indicate in a program listing in a source code file, for example, that at that point in the program source code, a particular rule (source code programming architecture objective) is applicable going forward.

As one example, the first rule (programming design objective) 202 shown in the source code configuration rules repository 110 indicates that the source code architecture from that point on is designed for parallelization in a processing system. The second rule (programming design objective) 204 in the rules repository 110 indicates that the source code is partitioned from that point forward. The third rule (programming design objective) 206 indicates that source code is set to check point at the location of the tag/annotation in a source code file. The fourth rule (programming design objective) 208 indicates that the source code is deterministic from the point in the source code where the tag/annotation is located going forward. The fifth rule (programming design objective) 210 indicates stateless operation of a program from the point where located in the source code. The sixth rule (programming design objective) 212 indicates non-blocking, and the seventh rule (programming design objective) 214 indicates that is monotonic operation. These rules (programming design objectives) are only for example and there are many variations that can be created and applied to programmed source code for different systems and applications.

As shown in FIGS. 3-18, a user interacts with an integrated development environment 132 via the information processing system 100 to develop source code for a program that can be parallelized for operation in a target information processing system. This is only a non-limiting example to illustrate various embodiments according to the present disclosure.

As shown in FIG. 3, the user inter-operates with the integrated development environment (IDE) 132 via the user interface 112 using the editor 134 to create source code that is stored in the source code repository 118. The user creates a composite operator that can be parallelized, and adds to the source code a tag/annotation (@Parallel) 302 just before the start of the composite operator to indicate that the program source code design is intended to operate in a parallel fashion.

As the user continues to use the source code editor 134 to create source code, as shown in the example of FIG. 4, the source code analyzer 128 analyzes at least a portion of the source code created by the user. At the graph clause, the source code analyzer 128 via the user output interface 114, such as at a display, displays one or more messages comprising completion proposals 402 for the graph clause. The source code analyzer 128 outputs one or more messages in response to determining that a selected at least a portion of the source code fails to conform to one or more constraints of the rule and related programming design objective indicated by the tag 302, the determining being based at least on the tag 302 and the analyzing of the at least a portion of the source code. That is, the source code analyzer 128 based on the source code configuration rule (programming design objective) 202 for parallelizing the source code architecture, provides several proposals, such as via a pop-up dialog box 402 on the display (user output interface) 114, for the user to consider in creating the remainder of the graph clause. These proposals 402 can comprise hints and quick fix proposals for fixing the selected at least a portion of the source code at the graph clause. These proposals 402, while shown in FIG. 4 in lexicographic order, may be ordered alternatively by parallelizability. Of course, these proposals may be ordered in many other ways suitable for presentation to the user.

The listed proposals pointed to by the label 404 in FIG. 4 would be displayed in yellow color, in the present example, to indicate that these proposals may violate the parallelization rule and related programming design objective 202, indicating that the user must specifically configure these operators to conform with the parallelization rule 202. The listed proposals pointed to by the label 406 in FIG. 4, according to the example, would be displayed in red color to indicate to the user that these proposals would violate the parallelization rule and related programming design objective 202. The proposals that are pointed to by the label 408 in FIG. 4 would be displayed in green color, according to the present example, to indicate to the user that these proposals would be acceptable in meeting the programming design objective of parallelization according to the related rule 202. The one or more source code completion proposals in the pop-up dialog box 402 on the display, according to the present example, are categorized at least by color associated with each of the one or more source code completion proposals according to meeting the particular programming design objective 202.

The user can consider the various proposals in designing the source code architecture, while being guided to meet the programming design objective of parallelization 202, in the present example. While color is used in the current example to indicate likely compliance with the particular rule and programming design objective 202, other mechanisms, or even a combination of color and other mechanism, can be used by the source code analyzer 128 to communicate via the user interface 112 with the user to indicate the levels of compliance to meet the particular rule 202. For example, different highlighted background patterns displayed in black, white, and gray could alternatively be used to indicate levels of compliance with the rule and related programming design objective 202.

FIG. 5 shows what may happen, according to the current example, with the user operating the user interface 112 to move a cursor over one of the proposals, such as the functor "Join—Basic join template" proposal. When the user moves the cursor and hovers the cursor over the particular listed proposal, a pop-up dialog box 502 provides more detailed explanation (e.g., hints) of the implications of using such proposal in view of the rule and related programming design objective 202 for parallelization indicated by the tag 302. The pop-up dialog box 502 indicates that the Join proposal when used at that point in the source code would be an operator that maintains state which cannot be auto-parallelized.

Continuing with the present example, as shown in FIG. 6, the user using the source code editor 134 continues to add source code for three operators as shown. As can be seen in FIG. 6, a warning marker and a quick fix icon 602 are displayed related to the FileSource( ) element that is selected in the source code.

Then, as shown in FIG. 7, when the user moves the cursor to fly (hover) over the warning marker and quick fix icon 602, a pop-up dialog box appears 702 that describes in more detail the warning (e.g., provides hints and/or quick fix proposals). In this case, the FileSource operator cannot be auto-parallelized as shown. The source code analyzer 128 outputs one or more messages, such as examples shown in FIGS. 7 and 8, in response to determining that a selected at least a portion of the source code fails to conform to one or more constraints of the rule and related programming design objective 202 indicated by the tag 302, the determining being based at least on the tag 302 and the analyzing of the at least a portion of the source code. That is, the source code analyzer 128 based on the source code configuration rule and related programming design objective 202 for parallelizing the source code architecture, provides several proposals, such as via a pop-up dialog box 802 on the display (user output interface) 114, for the user to consider in creating the remainder of the graph clause. These proposals 802 can comprise hints and quick fix proposals for fixing the selected at least a portion of the source code at the graph clause.

Continuing with the example as shown in FIG. 8, while hovering the cursor over the warning marker and quick fix icon 602, the user can select, such as by clicking the right mouse button, the hint and quick fix pop-up menu 802 as shown. Specifically, when the cursor hovers over the quick fix menu item in a first pop up menu, a second walking menu pops up 802, with the first menu item pre-selected. In this way, the user sees hints and quick fix proposals in the second walking menu 802 and can select a quick fix to disable auto-parallelization for the operator FileSource( ) that is selected in the at least a portion of the source code.

FIG. 9 shows how the quick fix is applied (e.g., a tag is inserted by the source code annotator 130 at the selected location in the source code) to disable auto-parallelization for the operator FileSource( ) that is selected in the at least a portion of the source code. As can be seen by comparing FIG. 9 to FIG. 8, the warning marker and quick fix icon 602 has disappeared.

Continuing on FIG. 10, while adding code to configure the Functor operator, the user sees on the display completion proposals 1002 provided by the source code analyzer 128. As shown in FIG. 11, the user selects the logic clause from the menu items for completion proposals. Then, the pop-up menu shown 1102 is displayed to the user with completion proposals for the logic labels. In summary, the source code analyzer 128 outputs one or more messages in response to determining that a selected at least a portion of the source code fails to conform to one or more constraints of the rule and related programming design objective 202 indicated by the corresponding tag 302 in the source code. The determining is based at least on the tag 302 and the analyzing of the at least a portion of the source code. That is, the source code analyzer 128, based on the source code configuration rule (programming design objective) 202 associated with the tag 302 in the source code, provides several proposals such as via a pop-up dialog box 1102 on the display (user output interface) 114, for the user to consider in creating the remainder of the logic labels in the source code.

Then, in FIG. 12 the user enters text using the source code editor 134 to define the stateful variable in the functor's logic clause, as shown. A warning marker and quick fix icon 1202 is displayed to the user to indicate that the stateful variable precludes the functor from being auto-parallelized. The user then can move the cursor on the display to hover over the warning marker and quick fix icon 1202, and while hovering over the icon 1202 a pop-up dialog box 1302 (see FIG. 13) appears which provides a message that informs the user that the stateful variable cannot be auto-parallelized as shown.

Continuing in FIG. 14, while the cursor is hovering over the warning and quick fix marker 1202, the user clicks the right mouse button and a pop-up menu of hints and quick fixes 1402 is shown with a hint and quick fix pre-selected. Specifically, a first menu appears and when the cursor is moved and hovers over the quick fix item, a second walking menu 1402 appears with a list of hints and quick fixes for the user to consider. The user selects the action in the second menu 1402 to suppress warning and thereby ignore the warnings that are shown.

In response to the user's selection in the menu 1402, a tag 1502 to suppress warnings is inserted by the source code annotator 130 into the selected location in the source code, as shown in FIG. 15. This tag 1502 is applied locally to the particular selected source code. FIG. 15 shows the result from the user applying the fix to suppress the warnings for the stateful variable. As can be seen by comparing FIG. 14 to FIG. 15, the tag 1502 has been inserted and the warning and quick fix marker 1402 has disappeared.

Continuing the creation of the source code, according to the present example, the user adds additional operators, as shown in FIG. 16, and completes an application. However, warning markers are generated for the Join and FileSink operators to indicate that these operators cannot be auto-parallelized. It should be noted that in FIG. 16 the FileSink operator is not visible because it is covered up by the pop-up dialog box 1604 showing the warning message for the Join operator. This FileSink operator is visible in FIG. 17. Returning to FIG. 16, the user moves and hovers the cursor over the warning marker 1602 for the Join operator and the dialog box 1604 pops up to inform the user with a message in the dialog box 1604 showing the particular warning. That is, the Join operator fails to conform to one or more constraints of the rule and related programming design objective 202 for parallelization. In summary, the source code analyzer 128 outputs one or more messages (e.g., the message in the dialog box 1604) in response to determining that a selected at least a portion of the source code (e.g., the Join operator) fails to conform to one or more constraints of the programming design objective indicated by the corresponding tag in the source code, the determining being based at least on the tag and the analyzing of the at least a portion of the source code.

As shown in FIG. 17, the user fixes the code by causing invocation of the source code annotator 130 to add the tag/annotation to disable auto-parallelization. In similar fashion the user fixes the code by adding the disable parallelization tag/annotation to the FileSink operator as shown.

According to various embodiments, the integrated development environment can provide in a separate window a graph view 1702 of the source code being created by the user. This graph view 1702 shows that the sub-graph within the rectangle used to be parallelized as shown. This graph view 1702 corresponds to the source code program listing being developed by the user.

As can be seen in FIG. 18, an alternative way of tagging/annotating the source code is equally applicable. In this alternative, individual operators are tagged/annotated rather than the composite operator. Both alternatives are equivalent. As can be appreciated from the example above, the integrated development environment 132 invoking and utilizing the source code analyzer 128 and the source code annotator 130 can guide the user while creating source code program listing to meet the parallelization programming design objective rule as defined in the rules repository 110.

According to an alternative embodiment of the present disclosure, the developer user may already have created an application, however without annotations/tags. In this case, the user submits the created source code to the integrated development environment 132 to be analyzed by the source code analyzer 128, such as shown in FIG. 19.

Figure 20:
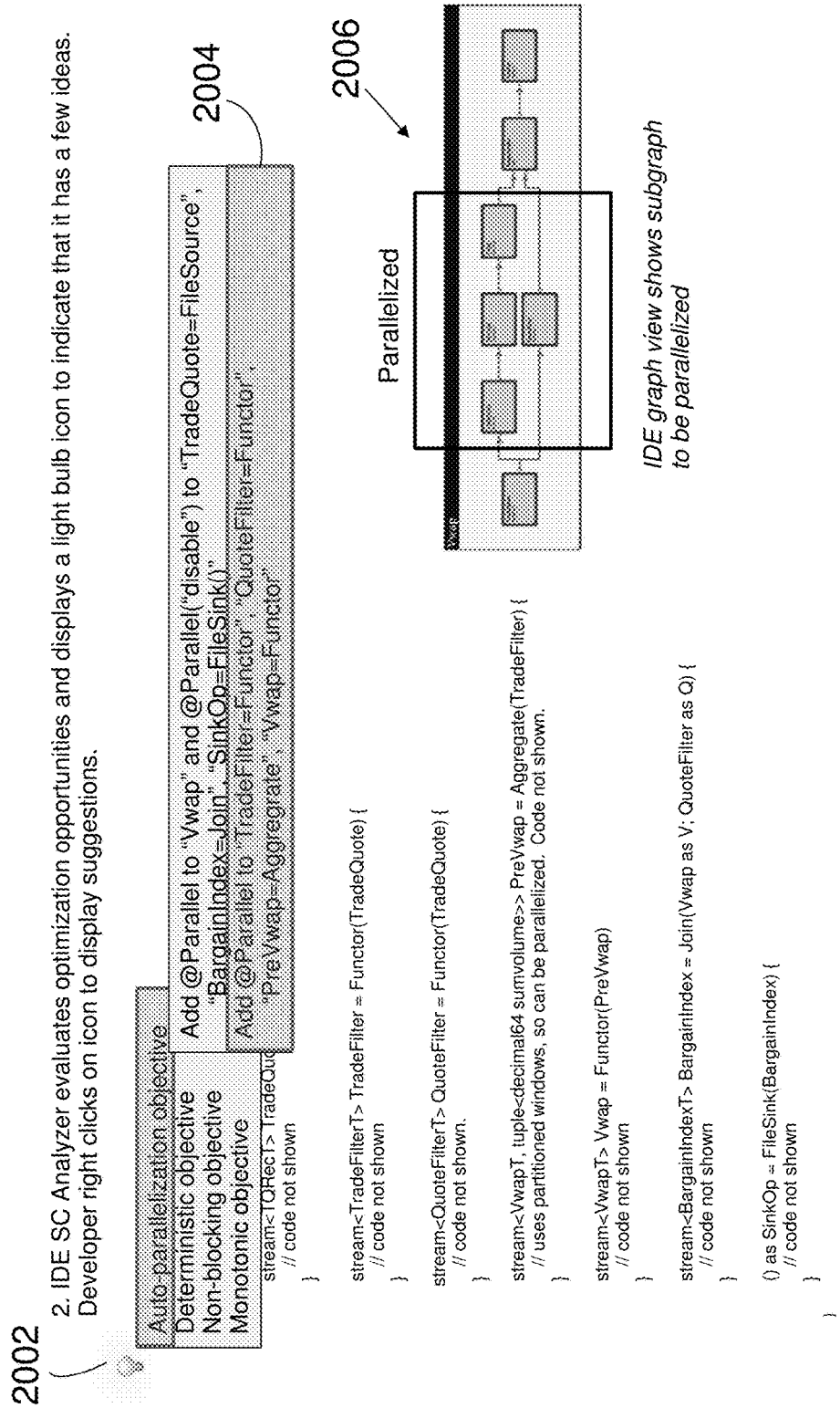

As shown in FIG. 20, according to one example, the source code analyzer 128 evaluates opportunities for optimization of a selected at least a portion of the source code according to the auto-parallelization rule 202 that has been selected from a set of rules (and related programming design objectives) stored in memory, such as in a source code configuration rules repository 110. The source code analyzer 130 selects the rule (and related programming design objective) 202 from the set of rules stored in the repository 110 based on a determination by the analyzer 130 that the rule and related programming design objective 202 is suitable for optimization of the selected at least a portion of source code. According to the present example, the determination that the selected rule and related programming design objective 202 is suitable for the selected at least a portion of source code is based on any one of: a determination that the selected at least a portion of source code conforms to one or more constraints of the selected rule and related programming design objective 202, and a determination that a quick fix may be applied by an update to the at least a portion of source code so that it conforms with the one or more constraints of the selected rule and related programming design objective 202. A warning marker and quick fix "light bulb" icon 2002 is displayed next to the source code at a location (at least a portion of the source code) where the source code analyzer 128 indicates there are proposals for optimization according to the auto-parallelization programming design objective and rule 202. When the user moves and hovers the cursor over the warning marker and quick fix icon 2002, one or more pop-up menus 2004 show that auto-parallelization may be applied at this location in the source code. According to the present example, a walking menu 2004 associated with the particular location in the source code is displayed to give the user the options for applying auto-parallelization to optimize the source code at this selected location.

The user may select one of the two options in the walking menu 2004 for optimization of the source code for auto-parallelization as shown in FIG. 20. A separate window displays an IDE graph 2006 to show the parallelized source code to the user. In this way, the user can make an informed decision regarding the programming design objectives of the source code architecture while reviewing the source code.

Continuing in FIG. 21, in response to the user accepting the suggestion to add the @parallel tag/annotation to the operators that support auto-parallelization, the source code annotator 130 inserts the tags/annotations into the source code as shown. Then, using the editor 134 as shown in FIG. 22, the user may edit the source code being displayed to add a stateful variable to a Functor annotated with the @parallel tag/annotation. In such a case, the source code analyzer 128 displays a warning marker and quick fix icon 2202 in the user output interface 114 since the stateful variable can't be parallelized. With the cursor hovering over the warning marker and quick fix icon 2202, a dialog box 2204 is displayed to the user to inform, in more detail, the determined violation of the auto-parallelization rule and programming design objective 202. The user then, according to the present example, clicks the right mouse button and selects a quick fix for the warning as shown in the walking pop-up menu 2302 of FIG. 23. In this case, the user has chosen to suppress the warning.

With the SuppressWarnings quick fix selected by the user, as shown in FIG. 24, the source code annotator 130 adds the @SuppressWarning annotation/tag to the Functor in the source code as shown. This applies the quick fix to the source code at the selected location in the source code. A comparison of FIG. 23 to FIG. 24 shows that the warning marker and quick fix icon 2202 has been removed.

In this way, as has been discussed by example above, the user can start with a source code file that is submitted to the IDE 132 such that the source code can be analyzed by the source code analyzer 128 to determine opportunities for optimization. The user then can interact with the IDE 132 and based on the proposals from the source code analyzer 128 the user can edit the source code by selecting the options proposed by the source code analyzer 128.

Figure 25:
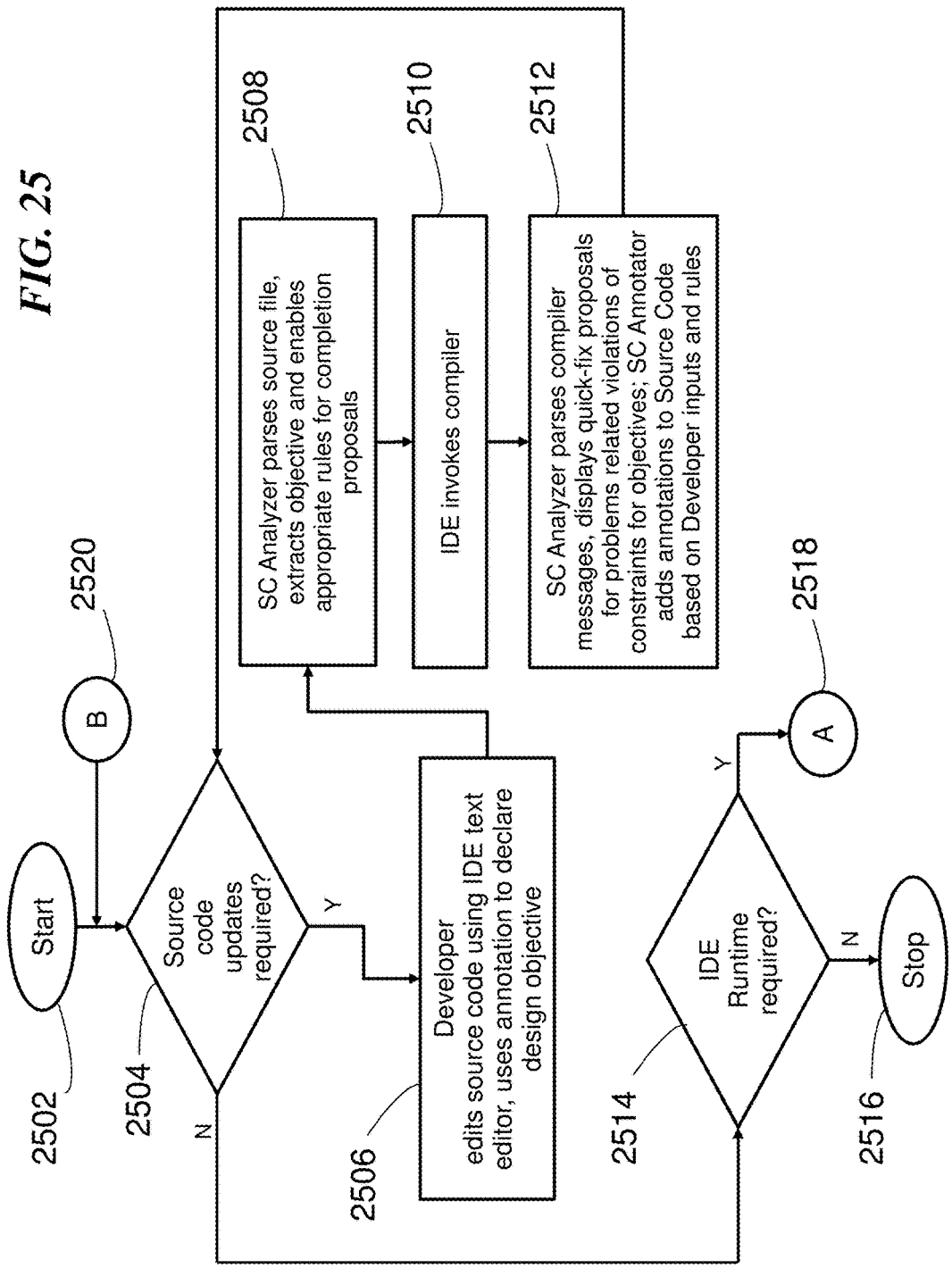
FIGS. 25 to 26 constitute an operational flow diagram illustrating an example process followed by a processor of the information processing system of FIG. 1, according to one embodiment of the present disclosure.
Figure 26:
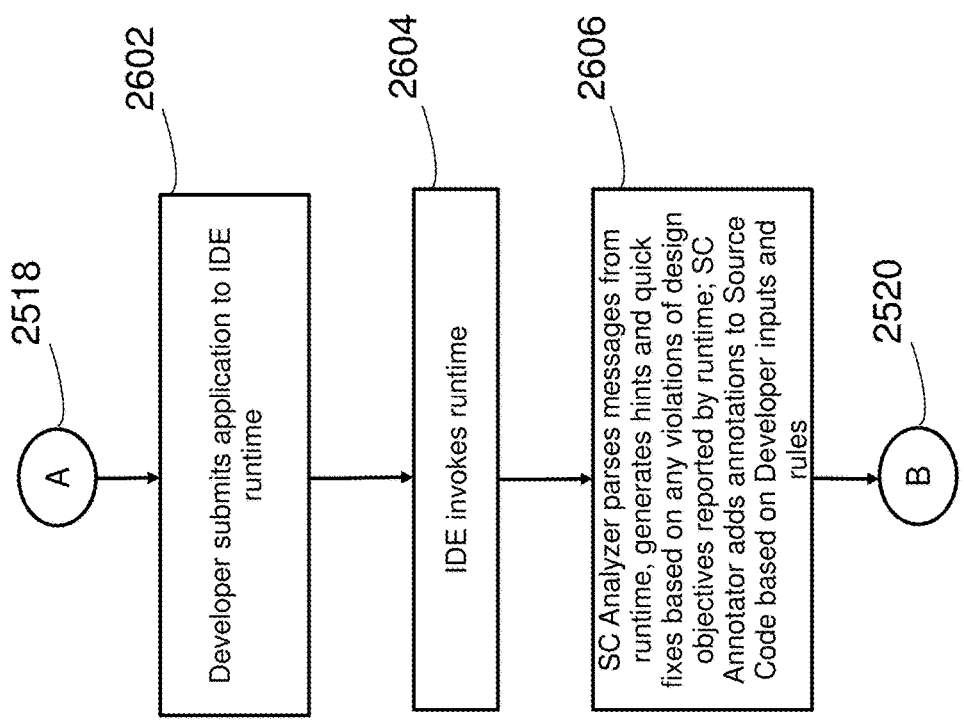

Referring now to FIGS. 25 and 26, an operational sequence, as shown in FIG. 25, starts at 2502 and then proceeds to decide whether source code updates are required, at step 2504. If the source code updates are required, at step 2504, then the developer edits source code using the IDE text editor 134 and inserts in the source code annotation/tags to declare programming design objectives, at step 2506.

While the source code is being updated, the source code analyzer 128, at step 2508, parses the source code file, extracts rules and programming design objectives indicated by one or more tags in the source code, and enables appropriate rules for providing completion proposals to the user. The integrated development environment 132, at step 2510, then invokes the compiler 136.

After the compiler has compiled the source code the source code analyzer 128, at step 2512, parses the compiler messages and displays quick fix proposals to the user for identified problems related to violations of rules and constraints for programming design objectives for the source code. The source code annotator 130 adds annotations/tags to the source code based on developer inputs and the rules that are being applied by the source analyzer 128. Then the operational sequence returns to test whether source code updates are still required, at step 2504. If source code updates are not required, at step 2504, then a determination is made as to whether the integrated development environment runtime 138 is required, at step 2514.

If it is not required, then the operational sequence stops, at step 2516. If the runtime is required, at step 2514, then the operational sequence continues, via the connector 2518 shown in both FIG. 25 and FIG. 26. The developer user, at step 2602, submits the source code and application to the integrated development environment runtime 138. The IDE runtime 138 is applied to the compiled application, at step 2604. The source code analyzer 128 parses messages from the runtime 138, at step 2606.

The source code analyzer 128 accordingly generates hints and quick fix proposals based on any determined violations of rules and constraints for programming design objectives as reported by the runtime 138. The source code annotator 130 adds annotations/tags to the source code program listing in the source code repository 118 based on the developer user inputs and the applicable rules and constraints for programming design objectives. The operational sequence then, via the connector 2520 shown in both FIG. 25 and FIG. 26, returns to the process shown in FIG. 25 to determine whether source code updates are required, at step 2504.

The operational sequence then may continue cycling through compiler invocations, at step 2510, and runtime 138 invocations, at step 2604, until no further source code updates are required, at step 2504. In the case where no source code updates are required, at step 2504, and no further IDE runtime is required, at step 2514, the operational sequence stops, at step 2516.

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor 102 is illustrated for information processing system 100, information processing systems with multiple CPUs or processors can be used equally effectively. Various embodiments of the present disclosure can further incorporate interfaces that each includes separate, fully programmed microprocessors that are used to off-load processing from the processor 102. An operating system (not shown) included in main memory for the information processing system 100 may be a suitable multitasking and/or multiprocessing operating system, such as, but not limited to, any of the Linux, UNIX, Windows, and Windows Server based operating systems. Various embodiments of the present disclosure are able to use any other suitable operating system. Some embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The term "programming design objective" is intended to broadly describe one or more software program architecture design objectives that developers of applications, and particularly of high performance and big data applications, can utilize to optimize performance and utilization of computing resources. For example, and not for limitation, the following list illustrates software program architecture design objectives: Parallel; Partitioned; Checkpoint; Deterministic; Stateless; Non-blocking; and Monotonic.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A method with an integrated development environment to guide development of applications to implement a programming design objective, comprising:
analyzing, with a source code analyzer of an integrated development environment, a selected at least a portion of source code stored in memory according to meeting each programming design objective from a set of programming design objectives stored in memory;
selecting, based on the analyzing, at least one programming design objective from a set of programming design objectives stored in memory, the set of programming design objectives including a plurality of different programming design objectives selected from the following: Parallel, Partitioned, Checkpoint, Deterministic, Stateless, Non-blocking, and Monotonic, the selected at least one programming design objective being determined suitable for the selected at least a portion of source code in development of an application that implements the selected at least one programming design objective, wherein the determination that the selected at least one programming design objective is suitable for the selected at least a portion of source code is based on one of:
  a determination that the selected at least a portion of source code conforms with the constraints of the selected programming design objective; or
  a determination that the selected at least a portion of source code fails to conform to one or more constraints of the selected programming design objective, and a further determination that a quick fix may be applied by an update to the at least a portion of source code so that it conforms with the constraints of the selected programming design objective; and
outputting, in response to the analyzing with the source code analyzer, by displaying on a display a message corresponding to the selected at least a portion of source code, wherein the message is based on, and indicative of, the selected programming design objective suitable for the selected at least a portion of source code, the displayed message being indicative of at least one of the plurality of different programming design objectives selected from the following: Parallel, Partitioned, Checkpoint, Deterministic, Stateless, Non-blocking, and Monotonic.

2. The method of claim 1, wherein the selected programming design objective comprises at least one of:
Parallel;
Partitioned;
Checkpoint;
Deterministic;
Stateless;
Non-blocking; and
Monotonic.

3. The method of claim 1, wherein the outputting comprises displaying in a user interface the message that is based on the selected programming design objective.

4. A method with an integrated development environment to guide development of applications to implement a programming design objective, comprising:
analyzing, with a source code analyzer of an integrated development environment, a selected at least a portion of source code stored in memory according to meeting each programming design objective from a set of programming design objectives stored in memory;
selecting, based on the analyzing, at least one programming design objective from a set of programming design objectives stored in memory, the selected at least one programming design objective being determined suitable for the selected at least a portion of source code, wherein the determination that the selected at least one programming design objective is suitable for the selected at least a portion of source code is based on one of:
  a determination that the selected at least a portion of source code conforms with the constraints of the selected programming design objective; or
  a determination that the selected at least a portion of source code fails to conform to one or more constraints of the selected programming design objective, and a further determination that a quick fix may be applied by an update to the at least a portion of source code so that it conforms with the constraints of the selected programming design objective; and outputting, in response to the analyzing with the source code analyzer, a message corresponding to the selected at least a portion of source code, wherein the message is based on, and indicative of, the selected programming design objective suitable for the selected at least a portion of source code, wherein the selected at least one programming design objective determined suitable for the selected at least a portion of source code comprises a selected plurality of different programming design objectives determined suitable for the selected at least a portion of source code, and wherein the outputting comprises contemporaneously displaying a plurality of different messages on a display, each displayed different message being based on, and indicative of, a respective different one programming design objective of the selected plurality of different programming design objectives suitable for the selected at least a portion of source code.

5. The method of claim 1, wherein the integrated development environment comprises a programming language compiler, the message is outputted by the source code analyzer, and the message is based on a message outputted by the programming language compiler.

6. The method of claim 1, wherein the integrated development environment comprises a runtime, the message is outputted by the source code analyzer, and the message is based on a message outputted by the runtime.

7. A computer readable storage medium, comprising computer instructions which, responsive to being executed by a processor, cause the processor to perform operations comprising:
analyzing, with a source code analyzer of an integrated development environment, a selected at least a portion of source code stored in memory according to meeting each programming design objective from a set of programming design objectives stored in memory;
selecting, based on the analyzing, at least one programming design objective from a set of programming design objectives stored in memory, the set of programming design objectives including a plurality of different programming design objectives selected from the following: Parallel, Partitioned, Checkpoint, Deterministic, Stateless, Non-blocking, and Monotonic, the selected at least one programming design objective being determined suitable for the selected at least a portion of source code, wherein the determination that the selected at least one programming design objective is suitable for the selected at least a portion of source code is based on one of:
a determination that the selected at least a portion of source code conforms with the constraints of the selected programming design objective; or
a determination that the selected at least a portion of source code fails to conform to one or more constraints of the selected programming design objective, and a further determination that a quick fix may be applied by an update to the at least a portion of source code so that it conforms with the constraints of the selected programming design objective; and
outputting, in response to the analyzing with the source code analyzer, by displaying on a display a message corresponding to the selected at least a portion of source code, wherein the message is based on, and indicative of, the selected programming design objective suitable for the selected at least a portion of source code, the displayed message being indicative of at least one of the plurality of different programming design objectives selected from the following: Parallel, Partitioned, Checkpoint, Deterministic, Stateless, Non-blocking, and Monotonic.

8. The computer readable storage medium of claim 7, wherein the selected programming design objective comprises at least one of:
Parallel;
Partitioned;
Checkpoint;
Deterministic;
Stateless;
Non-blocking; and
Monotonic.

9. The computer readable storage medium of claim 7, wherein the outputting comprises displaying in a user interface the message that is based on the selected programming design objective.

10. The computer readable storage medium of claim 7, wherein the selected at least one programming design objective determined suitable for the selected at least a portion of source code comprises a selected plurality of different programming design objectives determined suitable for the selected at least a portion of source code, and wherein the outputting comprises contemporaneously displaying a plurality of different messages on a display, each displayed different message being based on, and indicative of, a respective different one programming design objective of the selected plurality of different programming design objectives suitable for the selected at least a portion of source code.

11. The computer readable storage medium of claim 7, wherein the integrated development environment comprises a programming language compiler, the message is outputted by the source code analyzer, and the message is based on a message outputted by the programming language compiler.

12. The computer readable storage medium of claim 7, wherein the integrated development environment comprises a runtime, the message is outputted by the source code analyzer, and the message is based on a message outputted by the runtime.

13. An information processing system comprising:
a user output interface;
memory for storing source code;
a source code configuration rules repository for storing source code configuration rules and programming design objectives for development of applications;
an integrated development environment (IDE) comprising a source code editor and at least one of a programming language compiler and a runtime;
a source code analyzer for analyzing selected source code stored in the memory, and in response to the analyzing outputting a message; and
a processor communicatively coupled to the memory, the source code configuration rules repository, the IDE, and the source code analyzer, and wherein the processor, responsive to executing computer instructions, performs operations comprising:
analyzing, with a source code analyzer of an integrated development environment, a selected at least a portion of source code stored in memory according to meeting each programming design objective from a set of programming design objectives stored in memory;
selecting, based on the analyzing, at least one programming design objective from a set of programming design objectives stored in memory, the set of programming design objectives including a plurality of different programming design objectives selected from the following: Parallel, Partitioned, Checkpoint, Deterministic, Stateless, Non-blocking, and Monotonic, the selected at least one programming design objective being determined suitable for the selected at least a portion of source code in development of an application that implements the selected at least one programming design objective, wherein the determination that the selected at least one programming design objective is suitable for the selected at least a portion of source code is based on one of:
- a determination that the selected at least a portion of source code conforms with the constraints of the selected programming design objective; or
- a determination that the selected at least a portion of source code fails to conform to one or more constraints of the selected programming design objective, and a further determination that a quick fix may be applied by an update to the at least a portion of source code so that it conforms with the constraints of the selected programming design objective; and outputting, in response to the analyzing with the source code analyzer, by displaying on a display a message corresponding to the selected at least a portion of source code, wherein the message is based on, and indicative of, the selected programming design objective suitable for the selected at least a portion of source code, the displayed message being indicative of at least one of the plurality of different programming design objectives selected from the following: Parallel, Partitioned, Checkpoint, Deterministic, Stateless, Non-blocking, and Monotonic.

14. The information processing system of claim 13, wherein the selected programming design objective comprises at least one of:

Parallel;
Partitioned;
Checkpoint;
Deterministic;
Stateless;
Non-blocking; or
Monotonic.

15. The information processing system of claim 13, wherein the processor, responsive to executing the computer instructions, performs operations comprising:
displaying in a user interface the message that is based on the selected programming design objective.

16. The information processing system of claim 13, wherein the selected at least one programming design objective determined suitable for the selected at least a portion of source code comprises a selected plurality of different programming design objectives determined suitable for the selected at least a portion of source code, and wherein the outputting comprises contemporaneously displaying a plurality of different messages on a display, each displayed different message being based on, and indicative of, a respective different one programming design objective of the selected plurality of different programming design objectives suitable for the selected at least a portion of source code.

17. The information processing system of claim 13, wherein the integrated development environment comprises a programming language compiler, the message is outputted by the source code analyzer, and the message is based on a message outputted by the programming language compiler.

18. The information processing system of claim 13, wherein the integrated development environment comprises a runtime, the message is outputted by the source code analyzer, and the message is based on a message outputted by the runtime.

* * * * *